July 17, 1928. Re. 17,041
W. V. LOVELL
AUTOMATICALLY CONTROLLED VAPOR CONVERTER SUBSTATION
Original Filed Oct. 3, 1917
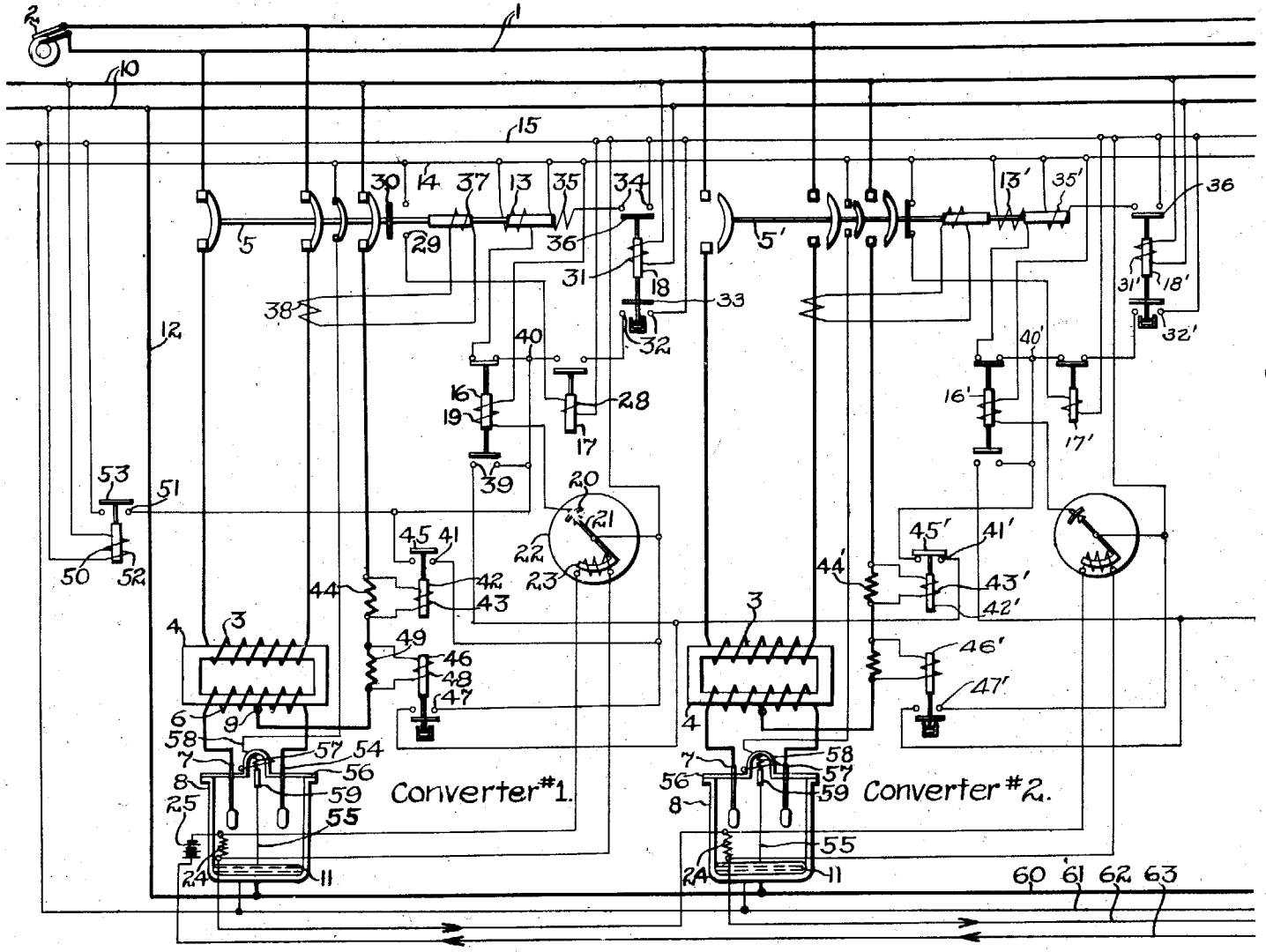
WITNESSES:
R. J. Butler.
J. E. Foster
INVENTOR
William V. Lovell.
BY
Wesley G. Carr
ATTORNEY Reissued July 17, 1928. Re. 17,041

UNITED STATES PATENT OFFICE.

WILLIAM V. LOVELL, OF NEW YORK, N. Y., ASSIGNOR TO WESTINGHOUSE ELECTRIC & MANUFACTURING COMPANY, A CORPORATION OF PENNSYLVANIA.

AUTOMATICALLY-CONTROLLED VAPOR-CONVERTER SUBSTATION.

Original No. 1,389,147, dated August 30, 1921, Serial No. 194,457, filed October 3, 1917. Application for reissue filed April 13, 1923. Serial No. 631,922.

My invention relates to means for automatically controlling the operation of a plurality of converting devices when installed in substations employed in connection with electric power-distribution systems.

An automatically-controlled substation may be defined as one in which the several operations of starting and connecting the converting apparatus to the line, whenever there is a demand for power, and finally shutting down and disconnecting the converting apparatus, after the demand for power has ceased, are all performed in their proper sequence without the assistance of an operator, either in the substation or in adjacent stations. The automatically-controlled substation has no direct connection to the main generating station other than through the power-supply circuits and is, therefore, essentially different from a remotely-controlled substation which requires a separate feeder to each piece of converting apparatus and in which the operations of both stopping and starting the apparatus are performed by an attendant in the station from which the power is supplied.

In Patent No. 1,358,713, issued November 16, 1920, to Edward P. Dillon, and assigned to the Westinghouse Electric & Manufacturing Company, is shown and described an automatically controlled vapor-converter substation in which the operations of starting and shutting down of a vapor converter are automatically controlled in accordance with changes in the condition of the electric circuits to which the converter is connected. The above-mentioned patent also describes an arrangement by means of which the converter is automatically shut down upon the occurrence of certain unfavorable conditions in its cooling system.

The object of my invention is to provide a system containing a plurality of converting devices and means for controlling the connection thereof to the system depending upon the load conditions of the system and the operating conditions of the devices.

A further object of the present invention is to provide an automatically controlled substation in which the operation of a plurality of vapor converters may be controlled simultaneously.

My invention further comprises means whereby only those converters which are in proper operating condition, as regards the absolute gas pressure therein, will be placed in service, the operation of my system being entirely selective with respect to both the number and operating condition of the converters that are placed in service at any time.

The single figure of the accompanying drawing is a diagrammatic view of the apparatus and circuit connections employed in an automatically controlled substation and arranged in accordance with my invention.

Mains 1 are connected to a suitable alternating-current source, such as a single-phase alternator 2, and the primary windings 3 of a plurality of supply transformers 4 are connected to the mains 1 through electrically operated switches 5. The terminals of the secondary winding 6 of the transformers are respectively connected to the anodes 7 of a plurality of converters 8, and intermediate points 9 of the secondary windings 6 are respectively connected to one main 10 of a direct-current receiving circuit, through the switches 5. The mercury cathodes 11 of the converters 8 are connected to a common lead 60—12 which is connected to the other main 10 of the direct-current receiving circuit.

The switches 5 are respectively provided with a closing coil 13 and 13′, one terminal of which is connected to one control conductor 14 and the other terminal of which is connected to the other control conductor 15, maintained at cathode potential through a lead 61, through the relays 16, 17 and 18, respectively. The relay 16 comprises an actuating coil 19, the terminals of which are connected to the control conductors 14 and 15 through the relatively movable contact members 20 and 21 of an indicating instrument 22 of the voltmeter type. The instrument 22 comprises a sensitive voltage coil 23, the terminals of which are connected to the terminals of a coil 24, preferably composed of tungsten or similar metal that is located within the casing of the converter 8. The instrument 22, together with the filament 24, constitutes what is known as a resistance-type vacuum gage, fully described in U. S. Patent 1,274,635, issued to the Westinghouse Electric & Manufacturing Company on Aug. 6, 1918, on an application filed by William Tschudy. In brief, the action is as follows. Constant current is passed through the filament and, as the absolute pressure of the surrounding medium is changed, the amount of heat removed by convection is changed, resulting in the alteration of the filament resistance, and, accordingly, of the IR drop thereacross. Rectifying devices of the vapor-arc type demand a certain absolute pressure for maximum efficiency, and it is the purpose of this vacuum gage to insure that a rectifier is not connected to the line if materially off in its absolute pressure. The coil 24 is connected in series with a source 25 of constant current through leads 62 and 63 and, as the current traversing the coil 24 varies in accordance with the pressure within the casing of the converter, the voltage drop across the coil 24 will also vary in accordance with the pressure within the casing. It is obvious, therefore, that the voltage impressed upon the coil 23 will vary in accordance with changes in the pressure within the casing of the converter. The movable contact member 21 of the device 22 is pivotally mounted and is adapted to be actuated by the coil 23. The stationary contact member 20 is segmental in form and is adapted to be engaged by the movable contact member 21 within certain portions of the arc described by the contact member 21. Thus, the coil 19 of the relay 16 will be energized only when the pressure within the casing of the converter is within certain limits. For instance, if the converter is of the vacuum type, the instrument 22 will be calibrated for degrees of vacuum but it will be readily understood that, if a gas other than air be employed within the casing of the converter, it may be found desirable to use a pressure of several atmospheres, in which case, the instrument 22 will be calibrated accordingly. From the foregoing, it is apparent that the closing coil 13 of the switch 5 will be energized and the converter 8 brought into service only within the optimum range of the absolute gas pressure within the casing of the converter.

The relay 17 is provided with an actuating coil 28 that is connected across the control mains 14 and 15 through stationary contact members 29 that are adapted to be connected by a bridging member 30 mounted on the plunger of the switch 5 only when the said switch is open. The relay 18 comprises a voltage coil 31 that is permanently connected across the direct-current mains 10. The lower stationary contact members 32 are adapted to be connected by a bridging member 33 only when the voltage across the direct-current mains 10 falls below a predetermined value. The upper stationary contact members 34 of the relay 18 are connected in the circuit of an opening coil 35 of the switch 5, the said circuit being completed by the upper bridging member 36 only when the voltage across the direct-current mains 10 exceeds a predetermined value. The relay 18 is so designed that its bridging members 33 and 36 are out of engagement with the respective pairs of stationary contact members 32 and 34 as long as the voltage across the direct-current mains 10 is within certain limits. The switch 5 is further provided with an overload tripping coil 37 that is adapted to be energized from the secondary winding 38 of a series transformer located in one of the leads to the primary winding 3 of the transformer 4, in response to substantially short-circuit conditions.

The relay 16 is further provided with lower stationary contact members 39 one of which is connected in the circuit of the closing coil 13 at a point 40 intermediate the contact members of the relays 16 and 17. The other contact member 39 is connected to the corresponding point 40′ in the circuit of the closing coil 13′ of the next adjacent switch 5′ through the contact members 41′ of a live-line relay 42′. The actuating coils 43 and 43′ of the relays 42 and 42′ are adapted to be energized from shunts 44 and 44′, respectively, located in leads to one of the direct-current mains 10. Consequently, the bridging members 45 and 45′ are held out of engagement with the contact members 41 and 41′ as long as the converter is in service.

Each converter 8 is further provided with overload time-limit relays 46 and 46′, respectively, the stationary contact members 47 and 47′ of which are connected between the control main 15 and the lead connecting the contact members 39 to the contact members 41 of the relay 42 of the next adjacent converter. The actuating coil 48 of the relay 46 is adapted to be energized from a shunt 49 located in one of the direct-current leads of the converter.

A low-line-voltage relay 50 comprises stationary contact members 51 that are connected between the control main 15 and the point 40 in the circuit of the closing coil 13 of the left hand converter 8. The voltage coil 52 of the relay 50 is connected across the direct-current mains 10, and the bridging member 53 is held out of engagement with the contact members 51 as long as the voltage across the direct-current mains 10 exceeds a predetermined value.

Each converter is provided with a starting or "keep-alive" device that comprises an electrode 55 that is suspended from a cap 56 by a flexible conductor 57. The cap 56 is formed of conducting material and is suitably insulated from the casing 8 of the converter. The cap 56 is surrounded by a solenoid 58, one terminal of which is connected to the cap 56 and the other terminal of which is connected to the control conductor 14 through the switch 5. The electrode 55 is provided with a core 59 that is adapted to be drawn up within the cap 56 when the solenoid 58 is energized. The electrode 55 is of sufficient length to extend below the surface of the mercury in the casing when the solenoid 58 is de-energized and is adapted to be withdrawn from the mercury when the coil is energized, thereby drawing an arc between the end of the electrode and the surface of the mercury.

Having described the various parts entering into my invention, the operation thereof, under various operating conditions, will now be discussed. For the first condition, it will be assumed that none of the converters 8 are connected to the alternating and direct-current supply and receiving circuits. If the voltage across the direct-current mains 10 falls below a predetermined value, the contact members 51 of the relay 50 will be connected. As the left-hand converter, which will hereinafter be designated as #1, is in its proper operating condition, as indicated by the instrument 22, the circuit of the closing coil 13 is completed and the switch 5 will close, thereby energizing the solenoid 58 of the "keep-alive" device and putting converter #1 in operation. In case the pressure within the converter #1 is not within the optimum range, the upper contact members of the relay 16 will be open, thereby rendering it impossible for the switch 5 to be closed. In this event, the lower contact members of the relay 16 are closed and the circuit of the closing coil 13′ of converter #2, or of the next adjacent converter that is in proper operating condition, will be completed.

For the next operating condition, let it be assumed that converter #1 is operating alone and that converter #2 is in an operating condition, as indicated. If the voltage across the direct-current mains 10 falls below a predetermined value, because of an excessive IR drop due to heavy load current, the following sequence of action will occur in the control system of converter #2. The lower bridging member 33′ of the relay 18′ will drop and complete the circuit between the contact members 32′. As relays 16′ and 17′ are both closed, the circuit of the closing coil 13′ is completed and the switch 5′ will be closed. Converters #1 and #2 will then be in operation. Assuming that the demand for direct-current energy which caused the drop in voltage, as described above, has ceased, the voltage across the direct-current mains will then rise and, if it exceeds a predetermined value, the upper bridging member 36′ of the relay 18′ will move upwardly and complete the circuit of the opening coil 35′, thereby removing converter #2 from the line. The actuating coils 31 and 31′ of the relays 18 and 18′ are so calibrated that the converter #2 will drop out before converter #1; converter #3 before #2, and so on.

For the next operating condition, let it again be assumed that converter #1 is operating and that it is overloaded although the voltage across the direct-current mains 10 is within normal limits. The relay 46 will then close and connect the point 40′ in the closing-coil circuit of converter #2 to the control main 15. If converter #2 is in the proper operating condition, the upper contact terminals of the relay 16′ will be closed, and converter #2 will be immediately connected to the line. If, however, the gas pressure within converter #2 is above or below the optimum range, the upper contacts of the relay 16 will be open and it will be impossible for the switch 5 to be closed. In this event, the lower contact members of the relay 16 are closed and the next adjacent converter that is in proper operating condition will be connected to the line, as previously described.

While various other operating conditions too numerous to be mentioned herein might be described, it is obvious that the demand for direct-current energy, in a vapor converter system embodying my invention, will always be met by the selective operation of only those converters which are in proper operating condition. Furthermore, it will be impossible to overload a converter unit so long as there are any units remaining in reserve that are in proper operating condition.

While I have shown my invention in its simplest and preferred form and as embodying specific forms of control devices, it is not so limited but is susceptible of various minor changes and modifications within the scope of the appended claims.

I claim as my invention:

1. The combination with an alternating-current source and a direct-current consuming circuit, of a plurality of vapor converters and means for selectively connecting one or more of said converters to said source and to said circuit in accordance with the gas pressure within said converters.

2. The combination with an alternating-current source and a direct-current consuming circuit, of a plurality of vapor converters and means for selectively connecting one or more of said converters to said source and to said circuit in accordance with the optimum operating absolute gas pressure within the respective converters.

3. The combination with an alternating-current source and a direct-current consuming circuit, of a plurality of vapor converters, and means dependent upon the load conditions in said circuit and upon the internal pressures of the converters for selectively connecting the converters to said circuit.

4. The combination with an alternating-current source and a direct-current consuming circuit, of a plurality of vapor converters adapted to be connected therebetween, and automatic means for insuring the disconnection of any converters which have faults of operation dependent upon pressure within the converter.

5. The combination with an alternating-current source and a direct-current consuming circuit, of a plurality of vapor converters, one of which is connected to said circuit, automatic means for disconnecting said converter from said circuit and means dependent upon the actuation of said first named means for selectively connecting one of the remaining converters to said circuit having a desired internal pressure.

6. The combination with an alternating-current source and a direct-current consuming circuit, of a plurality of vapor converters, one of which is connected to said circuit, automatic means for disconnecting said converter from said circuit and means dependent upon the actuation of said first named means for selectively connecting one of the remaining converters to said circuit having the optimum operating gas pressure therewithin.

7. In an electrical power system, the combination with an alternating-current circuit, a direct-current circuit and a plurality of converters for translating energy therebetween, of means for connecting the converters between the two circuits in a predetermined sequence in accordance with the power demand on one of the circuits and means responsive to a predetermined condition of the converters for varying said sequence.

8. In an electrical power system, the combination with an alternating-current circuit, a direct-current circuit and a plurality of converters for translating energy therebetween, of means for connecting the converters between the two circuits and means comprising an individual load-responsive relay associated with each converter and means responsive to the proper operating conditions of the converters for controlling the connection of another converter to the system when the associated converter is loaded to a predetermined degree.

9. In an electrical power system, the combination with an alternating-current circuit, a direct-current circuit and a plurality of converters for translating energy therebetween, of means for connecting the converters between the two circuits, means whereby the connecting means of the respective converters may be arranged to connect the converters to the system in a pre-determined sequence and means responsive to a predetermined condition of the converters for varying said sequence.

10. In an electrical power system, the combination with an alternating-current circuit, a direct-current circuit and a plurality of converters for translating energy therebetween, of means for connecting the converters between the two circuits and means responsive to an abnormal condition in one converter, by reason of which it is desired to preclude the operation thereof, for controlling the operation of the connecting means of another converter.

11. In an electrical power system, the combination with an alternating-current circuit, a direct-current circuit and a plurality of converters for translating energy therebetween, of means for connecting the converters between the two circuits, means whereby the connecting means are caused to operate to connect the respective converters to the system in a predetermined sequence according to the energy demand upon the system and means responsive to an abnormal condition in any converter or the associated connecting means, by reason of which it is desired to preclude the operation of such converter or connecting means, for controlling the connecting means of another converter.

12. In an electrical system, the combination with a circuit to which a plurality of translating devices is to be connected, of means for connecting the respective translating devices to the circuit comprising a plurality of relay devices operative in sequence, each relay device depending upon the proper operation of the relay device preceding in the sequence, an initiating relay for controlling the energization of the relay devices and means responsive to the condition of the circuit, the translating devices and the connecting means for controlling the effectiveness of the initiating relay.

13. In an electric system, the combination with an electric circuit and a plurality of electrical translating devices, of means responsive to the power demand on said circuit for automatically connecting the devices into the circuit in predetermined sequence, and means responsive to abnormal conditions in said devices for preventing the connection thereof into said circuit.

14. In an electrical power system, the combination with an alternating-current circuit, a direct-current circuit and a plurality of converters for translating energy therebetween, means dependent upon the proper operative condition of one of said converters for effecting the electrical connection thereof to said circuits, means responsive to load conditions in said converter for connecting additional converters to said circuits, and means responsive to predetermined conditions in said additional converters for preventing the electrical connection thereof to said circuits.

15. The combination with an electric circuit and a plurality of electrical devices to be connected thereto, of means for automatically connecting said devices in said circuit in predetermined sequence, and means associated with each of said devices responsive to predetermined conditions therein for preventing the connection of the device in said circuit.

In testimony whereof, I have hereunto subscribed my name this 7th day of March, 1923.

WILLIAM V. LOVELL.